United States Patent
Erden

(10) Patent No.: US 10,090,010 B1
(45) Date of Patent: Oct. 2, 2018

(54) USING DISK DRIVE PARALLELISM TO INCREASE DRIVE CAPABILITY WHILE MAINTAINING A BASELINE PERFORMANCE

(71) Applicant: Seagate Technology LLC, Cupertino, CA (US)

(72) Inventor: Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/702,933

(22) Filed: Sep. 13, 2017

(51) Int. Cl.
*G11B 5/09* (2006.01)
*G11B 5/58* (2006.01)
*G11B 19/20* (2006.01)
*G11B 5/012* (2006.01)

(52) U.S. Cl.
CPC .............. *G11B 5/58* (2013.01); *G11B 5/012* (2013.01); *G11B 19/2072* (2013.01); *G11B 2220/2516* (2013.01)

(58) Field of Classification Search
None
See application file for complete search history.

(56) References Cited

U.S. PATENT DOCUMENTS

| 5,081,552 A | 1/1992 | Glaser et al. |
| 5,343,347 A | 8/1994 | Gilovich |
| 6,005,743 A | 12/1999 | Price et al. |
| 6,658,201 B1 * | 12/2003 | Rebalski ............... G11B 5/012 369/124.09 |
| 6,914,746 B1 * | 7/2005 | Meyer ................. G11B 5/5552 360/78.12 |
| 7,102,842 B1 * | 9/2006 | Howard ............... G11B 5/5521 360/61 |
| 2002/0141111 A1 * | 10/2002 | Batra ................... G11B 5/1278 360/125.17 |
| 2005/0105427 A1 * | 5/2005 | Cookson ............. G11B 7/0037 369/47.31 |
| 2005/0157597 A1 * | 7/2005 | Sendur ................. B82Y 10/00 369/13.55 |
| 2005/0237872 A1 * | 10/2005 | Nguyen ............... G06Q 20/123 369/44.14 |
| 2012/0176877 A1 * | 7/2012 | Mori ..................... G11B 5/607 369/53.41 |
| 2014/0022877 A1 * | 1/2014 | Ong ....................... G11B 20/24 369/43 |

* cited by examiner

*Primary Examiner* — Peter Vincent Agustin
(74) *Attorney, Agent, or Firm* — Hollingsworth Davis, LLC

(57) ABSTRACT

A baseline performance of a disk drive is found based on a media speed and a bit aspect ratio of the drive. A parallelism architecture is chosen for the disk drive based on an end-use application of the drive. The parallelism architecture includes two heads capable of simultaneously accessing one or more disks of the disk drive. An increased performance of the disk drive is determined due to the parallelism architecture, and at least one of the media speed and bit aspect ratio are reduced such that a final drive performance with the parallelism architecture satisfies the baseline performance, the baseline performance being less than the increased performance. The reduction of the media speed and/or bit aspect ratio increases another capability of the drive over that of the equivalent drive.

20 Claims, 4 Drawing Sheets

USING DISK DRIVE PARALLELISM TO INCREASE DRIVE CAPABILITY WHILE MAINTAINING A BASELINE PERFORMANCE

SUMMARY

The present disclosure is directed to using disk drive parallelism to increase drive capabilities while maintaining a baseline performance. In one embodiment, a baseline performance of a disk drive is found based on a media speed and a bit aspect ratio of the drive. A parallelism architecture is chosen for the disk drive based on an end-use application of the drive. The parallelism architecture includes two heads capable of simultaneously accessing one or more disks of the disk drive. An increased performance of the disk drive is determined due to the parallelism architecture, and at least one of the media speed and bit aspect ratio are reduced such that a final drive performance with the parallelism architecture satisfies the baseline performance, the baseline performance being less than the increased performance. The reduction of at the least one of the media speed and the bit aspect ratio is used to increase another capability of the drive.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Drives are typically categorized by capacity, although may be differentiated by other application-specific requirements, such as performance, reliability, etc. Performance requirements for some of the storage applications sometimes become a defining factor for the HDD configurations. For example, HDDs can have different media speed (expressed in revolutions-per-minute, or RPM), thereby having different performance, e.g., higher input-output operations per second (IOPS) for sequential data transfer.

Conventional recording technology (e.g., perpendicular magnetic recording, or PMR) is close to its limit in increasing areal density (AD). New technologies, like shingled magnetic recording (SMR), heat-assisted magnetic recording (HAMR), and bit-patterned magnetic (BPM) recording are being proposed to further increase AD. In order to achieve acceptable performance with these new technologies, the design points are being pushed away from maximizing AD and towards increasing performance measures such as IOPS and latency.

Additional HDD features described herein, generally described as "parallelism" architectures are seen as a way to increase these performance measures such as IOPS and latency. However, as described in the present disclosure, these parallelism architectures can also or instead be used to increase AD. This can be advantageous for some applications where performance is generally not emphasized as much as capacity, such as cold storage, video capture, etc.

Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures can extend to other components that operate in the HDD, including system controllers, servo controllers, read/write channels, host interfaces, caches, etc.

Figure 1:
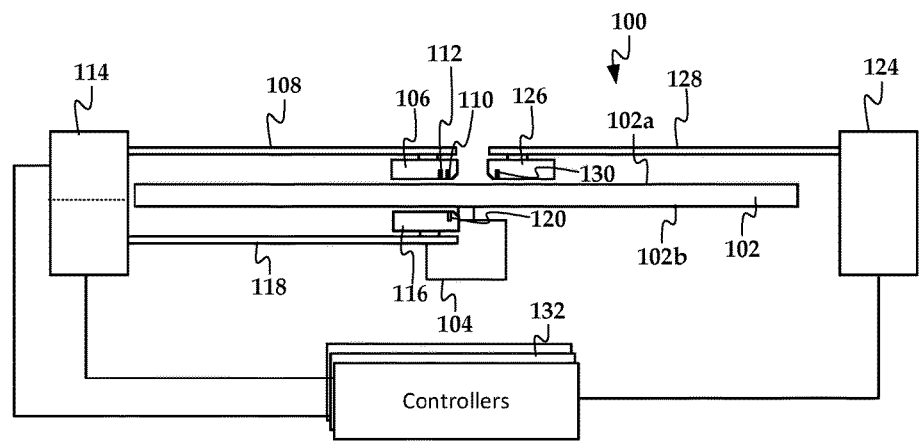
FIG. 1 is a diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116. The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time.

Two or more controllers 132 are coupled to the respective actuators 114, 124 and control movement of the actuators 114, 124. The controllers 132 may take commands from a system controller, e.g., specifying a seek location, track following commands, dithering. The controllers 132 determine the signals needed to move the actuators 114 to the commanded location, and utilize position data as feedback. The position data is generally provided by servo marks on the disk 102 that are read via the heads 106, 116, 126.

Generally, the availability of parallel actuators and heads gives a system designer increased flexibility in achieving a particular design point related to capacity and/or performance. Another system parameter that can be changed to alter system performance is bit aspect ratio (BAR), which is the ratio of bit density (number of bits per unit of downtrack distance) to track density (number of tracks per unit of crosstrack distance). The bit density can be changed by changing the speed of the media and/or the frequency of a reference clock used to read and write data. The track density can be changed by changing the track width.

In systems that utilize heat-assisted magnetic recording (HAMR), track width can be changed by changing power applied to an energy source (e.g., laser) that heats the recording medium, which changes the size of a hotspot that defines the bit dimensions. In another type of system known as shingled magnetic recording (SMR) and interlaced magnetic recording (IMR), adjacent tracks are overlaid on one another reducing the width of the tracks being overlaid. An SMR or IMR system can change width of at least some of the tracks by varying the distance that the adjacent tracks overlap.

Figure 2:
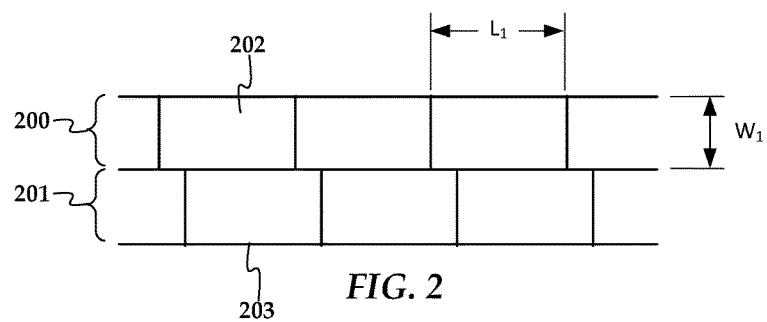
FIGS. 2 and 3 are block diagrams showing different bit aspect ratios according to example embodiments.
Figure 3:
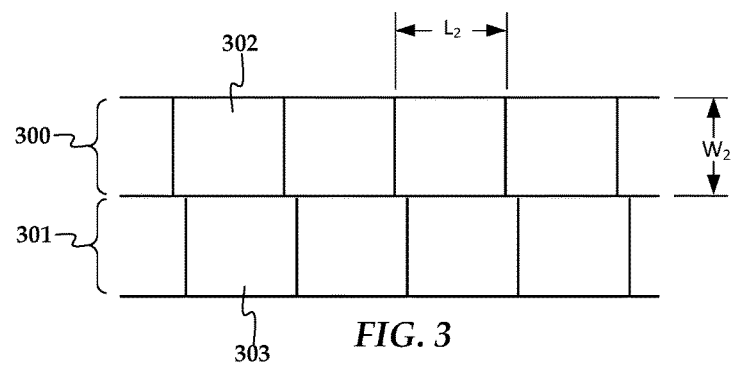

Changing BAR can change performance. For example, higher bit density can result in a faster clock for a given media speed, thereby increasing sequential data rate. In order to provide sufficient signal-to-noise ratio when bit density is increased, the track density may need to be decreased to increase the width of the bits to compensate for the shorter length. By changing BAR, some aspects of system performance/capacity can change, but will be balanced with other changes in system performance/capacity. In FIGS. 2 and 3, block diagrams illustrate data tracks written with different BAR according to example embodiments. As seen in FIG. 2, tracks 200, 201 have a series of bits 202, 203 written along each track length. Similarly, in FIG. 3, tracks 300, 301 have a series of bits 302, 303 written along each track length. The tracks 200, 201, 300, 301 are separated by guard bands (not shown), and the width of guard bands may vary based on the recording system being SMR or conventional.

The tracks 200, 201 have a width W1 that is less than width W2 of tracks 300, 301. This results in tracks 200, 201 being closer together, thus the track density of tracks 200, 201 (e.g., measured in tracks per inch, or TPI) is greater than that of tracks 300, 301. In order to compensate for these different widths, tracks 200, 201 have a larger bit length L1 than bit length L2 of the tracks 300, 301, which corresponds to a decreased bit density of tracks 200, 201 (e.g., measured in bits per inch, or BPI). Generally, any change in bit geometry that decreases one dimension will result in an increase in another dimension to maintain adequate SNR when reading back the bits. These dimensions can be expressed as a bit aspect ratio (BAR), e.g., BAR1=W1/L1 and BAR2=W2/L2. As should be apparent by inspection of the figures, BAR1<BAR2. For purposes of the following discussion, the setting of track width and/or bit length to different values will be referred to as setting of variable BAR (VBAR). This includes use cases where only one of track width and bit length are varied to obtain the VBAR.

Drives are typically categorized by capacity, although may be differentiated by other application-specific requirements, like performance, reliability, etc. Performance requirements for some of the storage applications sometimes become a defining factor for the HDD configurations. For example, drives can have different media speed (expressed in revolutions-per-minute, or RPM) and BAR, thereby having different performance and can be targeted to different applications. In order to satisfy a high throughput performance requirement, HDDs can be designed with higher RPM and higher BAR. If throughput is not of prime importance to another target application, the same HDD components can be designed to operate at lower RPM and lower BAR, thereby improving some other aspect of the drive more important to the target application, such as lower cost, lower power, etc.

As with any design decisions, there are trade-offs when focusing on a single metric such as throughput performance. For example, if RPM is increased to increase IOPS, mass of the total media in the HDD may be limited in order to fit into a required power budget. This can result in fewer platters and therefore less media surface compared to low RPM designs, which reduces drive capacity. It can be difficult to scale the variation in mechanical designs at high RPM, hence track widths may not be reduced as much for high-RPM designs compared to low-RPM designs, reducing track density. Reduction in track density and bit density result in reduced areal density (AD), hence less capacity. Similarly, if bit density is increased (which results in increasing BAR), track density drops, which also reduces AD.

Today's HDDs generally operate at a design point where high AD corresponds to low BAR, and vice versa. Conventional PMR technology is approaching its limit of maximum AD. New technologies, like SMR, HAMR, and BPM prefer a low BAR operating point more than the PMR technology; hence effects of performance requirement on BAR will push these technologies to a design point further away from their optimum high AD, low BAR, design point.

Performance centric HDD designs, e.g., those using parallelism architectures, mainly target performance of the drive for a given use case. In such a case, the HDD design has a defined AD and capacity and a suitable parallelism architecture is applied to boost performance. In embodiments described below, a process is described where a parallelism architecture is applied to boost capacity and/or AD (which again leads ultimately to total drive capacity) instead of boosting performance. In such a case, the performance may remain substantially the same as the case where the parallelism architecture was not used at all. A summary of such a process according to an example embodiment is shown in the flowchart of FIG. 4.

The process involves identifying 400 a performance target, e.g., measured in IOPS. A parallelism architecture option is then chosen 401 based on the transfer lengths and type of requests for that specific application. For example, if the application is sensitive to sequential IOPS but not so sensitive to random access (which itself is more sensitive to latency, seek time, data acquisition settling time, etc.), then an architecture with a single actuator that drives two or more heads that read from two or more surfaces may be selected. Conversely, if the application is sensitive to random data access performance, then a parallelism architecture with two or more independent actuators that can access the same or different surfaces simultaneously may be selected.

After the parallelism architecture is chosen 401, the RPM and BAR targets are defined 402 with the parallelism option present. Generally, this will allow one or both of BAR and RPM to be lowered while maintaining the same performance target defined at block 400. Thereafter, the rest of the drive parameters, such as media disk size, number of disks, etc. can be defined 403 accordingly. This will generally result in a target drive with higher capacity than an equivalent drive, where both the target drive and the equivalent drive meet the performance targets identified at block 400.

Figure 4:
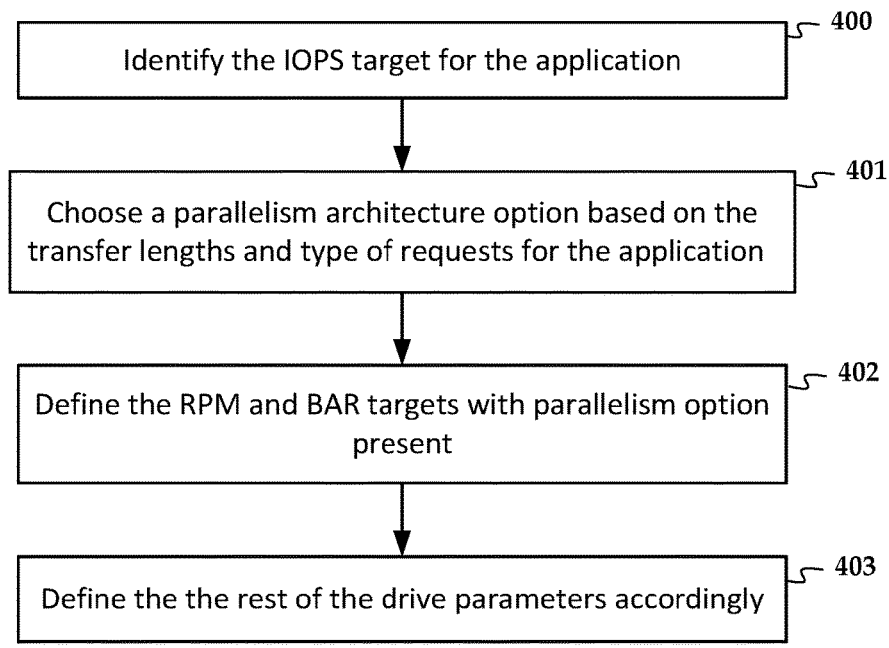
FIG. 4 is a flowchart of a procedure according to an example embodiment.
Figure 5:
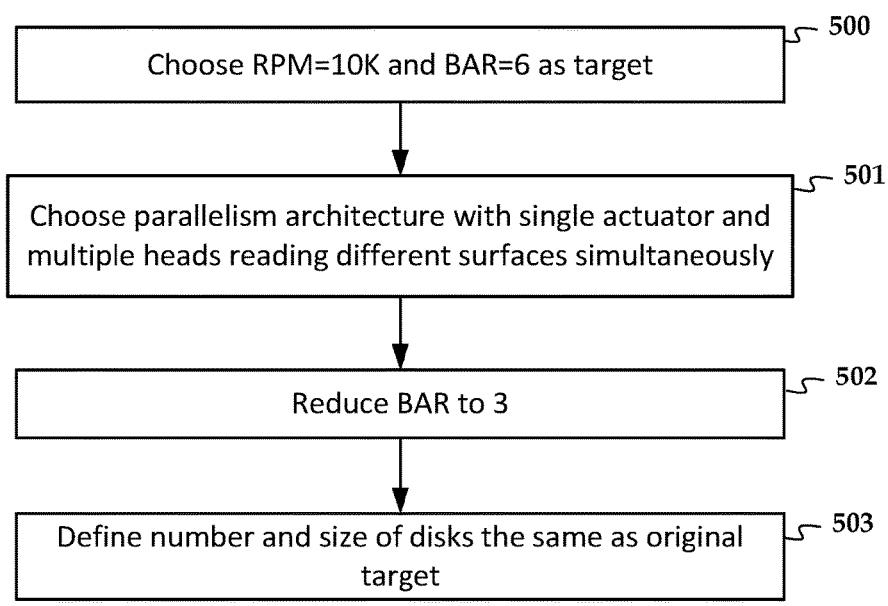
FIGS. 5 and 6 are flowcharts showing a procedure according to FIG. 4 with specific parameter values.

In FIG. 5, a flowchart shows an example of the process shown in FIG. 4, using specific parameter values. In this example, a 10K RPM drive with IOPS operating at BAR=6 is chosen 500 as the target performance. The IOPS for such a combination may be known from existing drive performance or from modeling. The parallelism architecture chosen at block 501 uses a single actuator with multiple heads reading different surfaces simultaneously. This architecture can double the sequential read and write performance once the parallel heads are on track. The 10K RPM is kept the same BAR is reduced 502 from BAR=6 to BAR=3 for the new drive design. This parallelism design operating at BAR=3 is equivalent to conventional HDD performance at BAR=6 once the head is on the track. Since RPM didn't change, the media size and number of disks can be defined 503 as the same as the target device defined at block 500. Since BAR is halved, the drive will yield more AD, especially with new technologies like HAMR.

Figure 6:
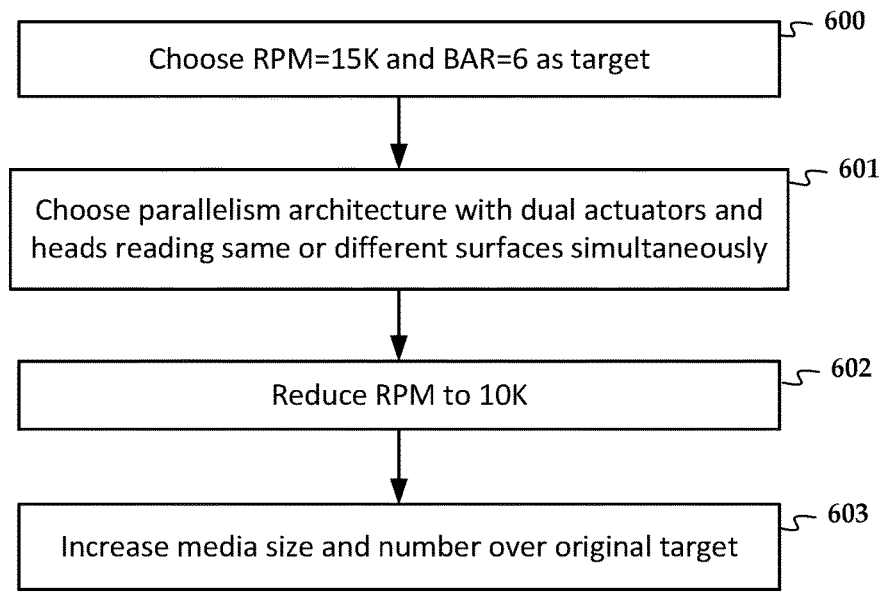

In FIG. 6, a flowchart shows another example of the process shown in FIG. 4 with specific parameter values. In this example, a 15K RPM drive with IOPS operating at BAR=6 is chosen 600 as the target performance. The parallelism architecture chosen at block 601 uses a dual actuator with multiple heads reading the same or different surfaces simultaneously. This architecture can boost performance by 50% for the transfer lengths and type of requests of the targeted application. The 15K RPM is reduced 602 to 10K RPM, while from BAR=6 is unchanged. With the 50% performance boost provided by the parallelism, a 10K RPM drive yields 15K RPM drive performance at the same BAR. Because the RPM is reduced, the media size can be increased 603, e.g., from 57 mm to 84 mm, a threefold increase in media surface. The number of media platters can also be increased 603 to 8 from 3, giving an 8/3 increase in number of platters. The overall capacity increase in such a case will be 3*8/3=8.

The example shown in FIG. 5 focuses on BAR's effect on capacity while the example shown in FIG. 6 focuses on RPM's effect on capacity. Both BAR and RPM can be jointly optimized for a given recording technology. Combined with the appropriate parallelism architecture option, such a jointly optimized device can be targeted to a pre-defined market segment. Although the examples show that the parallelism architecture increases drive capacity while keeping the baseline performance of an equivalent, non-parallelism drive, other drive performance measures other than capacity can be tailored, such as power consumption, reliability, robustness, etc. For example, in the example shown in FIG. 6, instead of increasing 603 the media size and number, the media can remain the same, resulting in decreased power consumption. Similarly, in the example of FIG. 5, if the BAR was reduced but track pitch remained the same, there would not be an increase in AD but would likely be an increase in reliability, by for example increasing the clearance metric between head and media.

Figure 7:
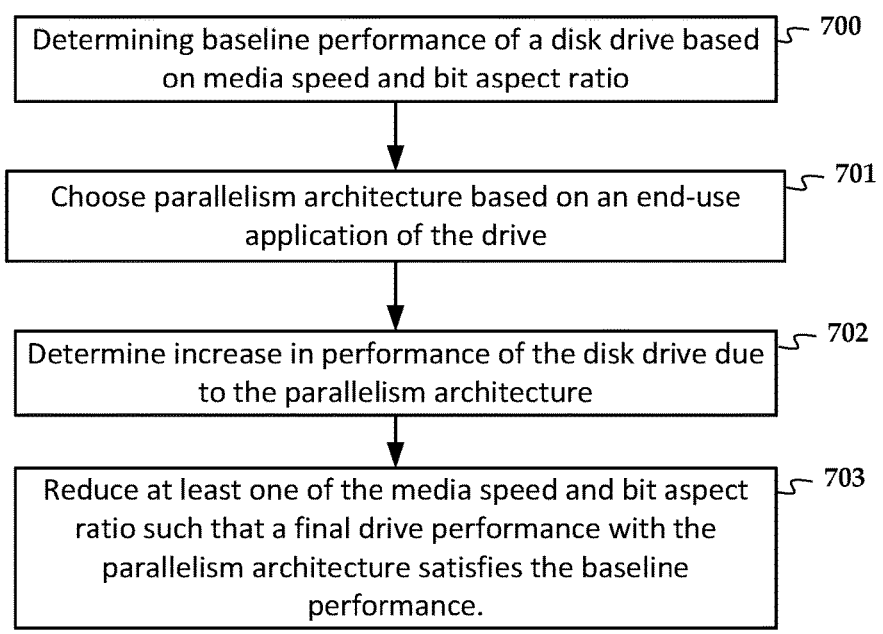
FIG. 7 is a flowchart of a method according to an example embodiment.

In FIG. 7, a flowchart shows a method according to an example embodiment. The method involves determining 700 baseline performance of a disk drive based on media speed and bit aspect ratio. The baseline performance may be defined based on any combination of performance measures, including IOPS, latency, power consumption, reliability, etc. A parallelism architecture is chosen 701 for the disk drive based on an end-use application of the drive (e.g., enterprise, consumer, gaming, archiving, etc.). An increase in performance of the disk drive due to the parallelism architecture is determined 702. At least one of the media speed and bit aspect ratio are reduced 703 such that a final drive performance with the parallelism architecture satisfies (e.g., is the same as or nearly the same as) the baseline performance. The reduction of the media speed and/or bit aspect ratio can be used to increase storage capacity of the drive over that of an equivalent drive that achieves the baseline performance without the parallelism architecture.

In the above embodiments, a non-parallelism drive is analyzed to determine a baseline performance (e.g., IOPS). In some situations, this baseline performance may be considered equivalent to a drive that is constructed with a parallelism architecture, but is operating with the architecture disabled. For example, if the drive can operate in a mode where only one head and one actuator is used to access data, this performance may be considered roughly equivalent to a drive without the parallelism but otherwise similar in terms of type of read/write head, media speed, controller hardware and software, etc. Note that such a comparison may not yield equivalent results for all performance measurements. For example, if only one part of a split actuator design is operating, it may be able seek more quickly than an equivalent actuator that is not split due to the decreased mass of the split part compared to a full arm assembly.

Figure 8:
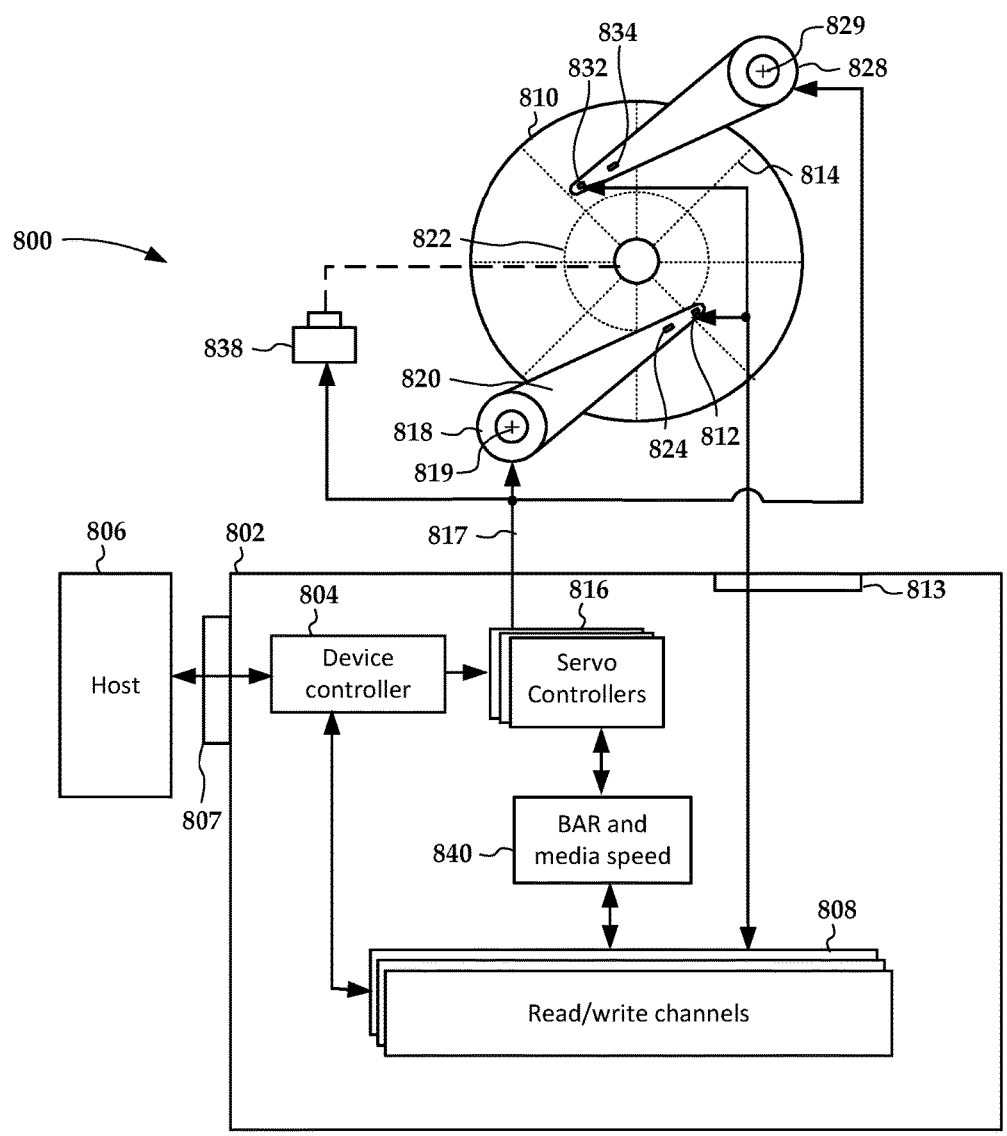
FIG. 8 is a block diagram of a data storage drive according to an example embodiment.

In FIG. 8, a block diagram illustrates a data storage drive 800 that utilizes one or more read/write heads 812 according to example embodiments. The apparatus includes circuitry 802 such as one or more device controllers 804 that process read and write commands and associated data from a host device 806 via a host interface 807. The host interface 807 includes circuitry that enables electronic communications via standard bus protocols (e.g., SATA, SAS, PCI, etc.). The host device 806 may include any electronic device that can be communicatively coupled to store and retrieve data from a data storage device, e.g., a computer, a server, a storage controller. The device controller 804 is coupled to one or more read/write channels 808 that read from and write to surfaces of one or more magnetic disks 810.

The read/write channel 808 generally converts data between the digital signals processed by the device controller 804 and the analog signals conducted through two or more heads 812, 832 during read operations. The two or more heads 812, 832 each may include respective read transducers capable of concurrently reading the disk 810, e.g., from the same surface or different surfaces. The read transducers may be configured to read in any mode, such as conventional single-track with single reader, or various TDMR modes like single track with multiple readers (MSMR) or multi-track with multiple readers (TDMR-MT). The two or more heads 812, 832 may also include respective write transducers that concurrently write to the disk 810. The write transducers may be configured to write using a HAMR energy source, and may write in various track configurations, such as conventional, SMR, and IMR.

The read/write channels 808 may include analog and digital circuitry such as digital-to-analog converters, analog-to-digital converters, detectors, timing-recovery units, error correction units, etc. The read/write channel is coupled to the heads 812, 832 via interface circuitry 813 that may include preamplifiers, filters, etc. As shown in the figure, the read/write channels 808 are capable of concurrently process one of a plurality of data streams from the multiple heads 812, 832.

In addition to processing user data, the read/write channel 808 reads servo data from servo marks 814 on the magnetic disk 810 via the read/write heads 812, 832. The servo data are sent to one or more servo controllers 816 that use the data to provide position control signals 817 to one or more actuators, as represented by voice coil motors (VCMs) 818. The VCM 818 rotates an arm 820 upon which the read/write heads 812 are mounted in response to the control signals 817. The position control signals 817 may also be sent to microactuators 824 that individually control each of the heads 812, e.g., causing small displacements at each read/write head.

The VCM 818 may be a stacked or split actuator, in which case two VCM parts are configured to independently rotate different arms about a common axis 819. In such a case, other heads (not shown) will access data on the disks simultaneously with that of heads 812, and these other heads may be coupled to circuitry 802 similar to illustrated head 832. In other embodiments, a second actuator, e.g., VCM 828, may independently and simultaneously rotate a second arm 830 about a second axis 829. Corresponding heads 832 and microactuators 834 may be rotated by the VCM 828 and may operate simultaneously with the heads 812 and microactuators 824 under commands from the one or more servo controllers 816.

A BAR and media speed module 840 generally define final performance parameters of the drive 800. The BAR calibration module 840 enables the controller 804 to determine a first bit aspect ratio of data recorded to the one or more disk surfaces that provides a baseline data transfer performance of the data storage drive 800 if only a single one of the heads 812, 832 processes the data stream. The first bit aspect ratio provides a first areal density for the disk 810. The controller 804 determines a second bit aspect ratio that results in the data storage drive 800 achieving the baseline data transfer performance using the two or more heads 812, 832 to simultaneously access the two or more data streams. The second bit aspect ratio provides a second areal density greater than the first areal density. During operation, the controller uses the second bit aspect ratio for reading from and writing to one or more disk surfaces via the two or more heads 812, 832.

In another embodiment, BAR calibration module 840 enables the controller 804 to determine a first speed of the one or more disks 810 that provides a baseline performance of the data storage drive 800 if only a single one of the heads processes the data stream. A second speed of the one or more disks 810 is determined that results in the data storage drive 800 achieving the baseline performance using the two or more heads 812, 832 to simultaneously access the two or more data streams. The second speed facilitates an increase in total surface area of the one or more disks. The second speed of the one or more disks 810 is used for reading from and writing to one or more disk surfaces via the two or more heads 812, 832.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    measuring performance of an equivalent drive to determined a baseline performance of a disk drive based on a media speed and a bit aspect ratio of the disk drive;
    choosing a parallelism architecture for the disk drive based on an end-use application of the drive, the parallelism architecture comprising two read/write heads capable of simultaneously accessing one or more disks of the disk drive;
    determine an increased performance of the disk drive due to the parallelism architecture; and
    configure the drive to reduce at least one of the media speed and bit aspect ratio such that a final drive performance with the parallelism architecture satisfies the baseline performance, the baseline performance being less than the increased performance, the reduction of at the least one of the media speed and the bit aspect ratio increasing a capability of the disk drive over that of the equivalent drive, the equivalent drive achieving the baseline performance without the parallelism architecture.

2. The method of claim 1, wherein the capability comprises a storage capacity of the disk drive.

3. The method of claim 1, wherein the capability comprises a reliability of the disk drive.

4. The method of claim 1, wherein the capability comprises a power efficiency of the disk drive.

5. The method of claim 1, wherein the baseline performance comprises a value of input-output operations per second.

6. The method of claim 1, wherein the parallelism architectures comprises two or more actuators that independently move the two or more read/write heads.

7. The method of claim 6, wherein the two or more actuators rotate about different axes, and wherein the two or more read/write heads access a same disk surface.

8. The method of claim 6, wherein the two or more actuators rotate about a same axis, and wherein the two or more read/write heads access different disk surfaces.

9. The method of claim 1, wherein the parallelism architectures comprises a single actuator that simultaneously moves the two or more read/write heads over different disk surfaces.

10. The method of claim 1, wherein the end-use application of the disk drive emphasizes sequential throughput.

11. The method of claim 1, wherein the end-use application emphasizes random throughput.

12. A data storage drive, comprising:
circuitry operable to cause two or more heads to simultaneously access separate data streams associated with one or more disk surfaces of the data storage device;
a controller configured to:
determine a first bit aspect ratio of data recorded to the one or more disk surfaces that provides a baseline data transfer performance of the data storage drive if only a single one of the heads processes the data stream, the first bit aspect ratio providing a first areal density, the data storage drive achieving a performance greater than the baseline performance at the first bit aspect ratio using the two or more heads to simultaneously access the two or more data streams;
determine a second bit aspect ratio that results in the data storage drive achieving the baseline data transfer performance using the two or more heads to simultaneously access the two or more data streams, the second bit aspect ratio providing a second areal density greater than the first areal density; and
using the second bit aspect ratio for reading from and writing to one or more disk surfaces via the two or more heads.

13. The data storage drive of claim 12, wherein the two or more heads are driven by two or more actuators that move independently about different axes.

14. The data storage drive of claim 12, wherein the two or more heads are driven by two or more actuators rotating about a same axis, and wherein the two or more heads access different disk surfaces.

15. The data storage drive of claim 12, wherein the two or more heads are driven by a single actuator that simultaneously moves the two or more heads over different disk surfaces.

16. A data storage drive, comprising:
circuitry operable to cause two or more heads to simultaneously access separate data streams associated with one or more disks of the data storage device;
a controller configured to:
determine a first speed of the one or more disks that provides a baseline performance of the data storage drive if only a single one of the heads processes the data stream, the data storage drive achieving a performance greater than the baseline performance at the first speed using the two or more heads to simultaneously access the two or more data streams;
determine a second speed of the one or more disks that results in the data storage drive achieving the baseline performance using the two or more heads to simultaneously access the two or more data streams, the second speed facilitating an increase in total surface area of the one or more disks; and
using the second speed of the one or more disks for reading from and writing to one or more disk surfaces via the two or more heads.

17. The data storage drive of claim 16, wherein the second speed facilitates increasing at least one of: a number of the one or more disks; and a diameter of the two or more disks.

18. The data storage drive of claim 16, wherein the two or more heads are driven by two or more actuators that move independently about different axes.

19. The data storage drive of claim 16, wherein the two or more heads are driven by two or more actuators rotating about a same axis, and wherein the two or more heads access different disk surfaces.

20. The data storage drive of claim 16, wherein the two or more heads are driven by a single actuator that simultaneously moves the two or more heads over different disk surfaces.

* * * * *